Patented Sept. 27, 1938

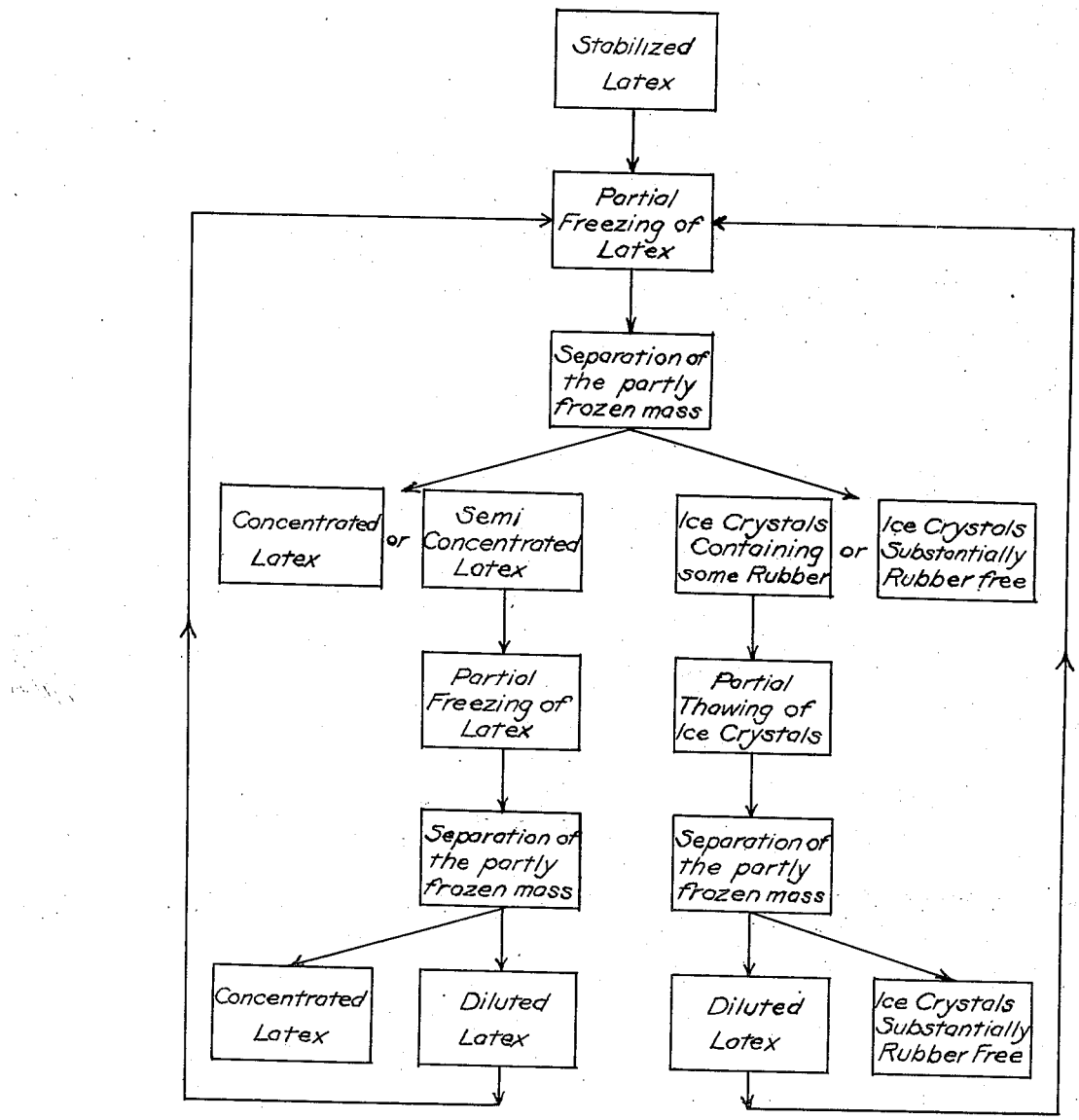

2,131,333

UNITED STATES PATENT OFFICE 2,131,333

PROCESS FOR THE CONCENTRATION OF AQUEOUS DISPERSIONS OF RUBBER AND SIMILAR RUBBER-LIKE SUBSTANCES

Hans Dietrich Graf von Schweinitz, Frankfort-on-the-Main-Hochst, Germany, assignor, by mesne assignments, to the firm of Revertex, Ltd., London, England Application March 19, 1937, Serial No. 131,964 In Germany March 21, 1936

10 Claims. (Cl. 18—50)

This invention relates to the concentration of aqueous dispersions of rubber and similar rubber-like substances, such as gutta-percha, balata and synthetic rubber.

Such dispersions have hitherto been concentrated by evaporation, centrifuging, creaming or filtration. These known methods have various drawbacks. For example, centrifuging and filtration require expensive apparatus which do not always work satisfactorily from a technical point of view, whilst in the evaporation process protective substances must be added to the rubber dispersion in order to increase its stability, and the presence of such projectile substance restricts the field of usefulness of the concentrate. Creaming, in turn, is only practicable with the aid of creaming agents which cause an increase in the viscosity of the concentrate which in many cases is undesirable.

In accordance with the present invention, stable concentrates of aqueous dispersions of rubber and the like substances are obtained in an entirely new manner, namely by partly freezing the dispersions and thereafter separating the liquid phase from the solid phase.

The fact that stable concentrates can be obtained in this manner is extremely surprising, since statements made in the literature led to the conclusion that when cold is applied to rubber and the like dispersions for a short time, the dispersions are unchanged on thawing, whereas when cold is applied for a long time coagulation must be expected on account of the hydrophilic or at least only slightly hydrophilic character of the dispersions.

It has now however been found that a distinct disintegration into a liquid phase rich in rubber and a solid phase poor in rubber, or in certain circumstances even free therefrom, occurs if the rubber dispersion be partly frozen or made to freeze completely and partly thawed again and then, preferably after mixing, the solid phase be separated from the liquid phase by one of the known mechanical separating methods (such as suction filtration). Such mixing and the subsequent separation of the liquid phase are possible because rubber dispersions do not solidify to a glass-like ice like pure water, but to a crystal broth or a readily friable crystal cake.

The partial thawing, mixing and separation can, if desired, be repeated several times with the solid residue left after the separation of the liquid, so long as said residue is not free from rubber. The fraction rich in rubber can also, if necessary, be further concentrated, by freezing it again and separating out the residual fraction poor in or free from rubber which crystallizes out. Thus, for example, a latex of 40% strength can be separated into a fraction of over 60% strength a very dilute fraction of, for example, from 2% to 3% strength, or if desired, even a fraction free from rubber. Thus for example, if the solid phase be precipitated in a form not already free from rubber, the solid residue obtained after the first process of freezing and separating the liquid fraction rich in rubber can be again subjected to a further fractionation. The solid fraction then remaining is separated from the process and any rubber contained therein can be extracted by one of the ordinary coagulation processes. The liquid fraction, richer in rubber, if desired mixed with fresh originating dispersion, is subjected to the same series of treatments. In this manner, the middle fractions are then always further treated. This manner of fractionating can naturally be extensively varied. The original proportion of rubber to the total dry components is not substantially altered by the concentrating process of the invention, which is very desirable for many uses.

If the hereindescribed method be employed for the concentration of rubber latex, for example, it is advantageous to subject the latter to one or more of the per se known preparatory processes, such as a preserving process, for example by means of ammonia or potassium hydroxide or bisulphite, or a stabilizing process, for example by means of soaps or Turkey-red oil, a fermentation process, for example by means of tryptase or diastase, storage, for example for a week at ordinary temperature, preheating, for example to 55° C. for 40 hours, preliminary coagulation or flocculation, for example by the addition of small quantities of acetic acid, treatment with adsorption media or with gases, containing if desired oxygen. It is also possible to use rubber latex to which creaming agents have been added and moreover vulcanized.

The hereindescribed freezing process may be applied to the treatment of concentrates of aqueous rubber dispersions obtained by known processes, and can also be used as a preliminary stage to any other known methods of concentration.

The freezing can be carried out in any of the plants usual for such purpose; for the sake of more rapid cooling and more uniform crystallization it can conveniently be carried out with mechanical agitation of the material to be cooled, but a satisfactory separation can be obtained also when the dispersion is not agitated. The mechanical agitation of the material can be effected by any method usual in such processes, for example stirring, blowing through air or gases, which are preferably previously cooled, and also shaking or circulating.

The separation of the two phases can also be carried out by any methods known technically, for example by simple filtration, but preferably, for example, by pressing, suction, centrifuging, preferably while operating in a continuous manner, for example utilizing the cold content of the fractions leaving the process on the counter-current principle.

The concentrates obtained in accordance with the invention are equal in properties to those obtained by evaporation, but for their production only about half the amount of energy needed for evaporation is required, while in addition any unfavorable action on the rubber by heat is eliminated, while all discoloration of the serum, such as frequently occurs in the case of concentrates obtained by evaporation, is avoided.

The stabilizing medium, for example ammonia, added before the process is carried out, is found after the fractionating freezing practically entirely in the concentrate. In this way losses of protective medium are avoided, while moreover the extraction of a high quality rubber from the serum poor in rubber by acid coagulation is facilitated and rendered less expensive in comparison with hitherto known methods of concentration.

The accompanying flow sheet and following examples will serve to illustrate the method of the present invention:

Example I 110 kgs. of rubber latex stabilized with ammonia and containing 40.7% (=45 kgs.) of dry substance, and a proportion of rubber to dry substance of 0.92 were frozen at, from —2° to —5° C., whilst stirring, to a thick broth. By drawing off by suction, the portion which has remained liquid and by partially thawing the solid residue, and again drawing off the liquid, three fractions were obtained, viz—

1st fraction:
   70.5 kgs. of 51.8% concentration (=36.6 kgs. of dry substance containing 92% of rubber).
2nd fraction:
   24.0 kgs. of 30.3% concentration (dry substance containing 91% of rubber).
3rd fraction:
   14.0 kgs. of 2.2% concentration.

A repetition of the treatment with the 1st fraction gave—
4th fraction:
   41.0 kgs. of 61.6% concentration (=25.2 kgs. of dry substance containing 92% of rubber).
5th fraction:
   19.0 kgs. of 49.3% concentration (dry substance containing 92% of rubber).
6th fraction:
   9.0 kgs. of 7.1% concentration.

By freezing twice, therefore, 56% of the dry substance was converted into a 61.5% concentrate.

Example II 3.95 kgs. of a rubber latex stabilized with ammonia and having a concentration of 40.7% (=1.62 kgs. dry substance) were completely frozen without agitation, partly allowed to thaw again, stirred thoroughly and separated off by suction filtration. By repeating the thawing and filtration, three fractions were obtained—

1st fraction:
   1.20 kgs. of 61.3% concentration (=0.74 kg. dry substance).
2nd fraction:
   2.10 kgs. of 40.8% concentration.
3rd fraction:
   0.69 kg. of 4.7% concentration.

By freezing once, 45% of the dry substance was converted into a 61.3% concentrate.

Example III 2 kgs. of the second fraction of Example II were mixed with 2 kgs. of fresh rubber latex, whereby a dispersion containing 40.75% of dry substance was produced, and the mixture was fractionated by freezing. There were obtained—

1st fraction:
   1.78 kgs. having a dry substance content of 55.6%.
2nd fraction:
   1.33 kgs. having a dry substance content of 38.3%.
3rd fraction:
   0.80 kg. having a dry substance content of 5.6%.

Example IV 50.0 kgs. of rubber latex stabilized with potash lye and soap (41.9%=21.0 kgs. dry substance) were frozen while stirring, until a thick crystal broth was formed. The fractions obtained as in Example I were as follows—

1st fraction:
   27.0 kgs. of 56.5% concentration (=15.3 kgs. dry substance).
2nd fraction:
   13.0 kgs. of 35.5% concentration.
3rd fraction:
   9.0 kgs. of 2.2% concentration.

Example V

The concentrate obtained in accordance with Example IV was concentrated to 73% by evaporation in the apparatus described in British patent specification No. 255,014.

Example VI

Of 380 grams of a 62% concentrate produced by evaporation and stabilized with ammonia, 250 grams were obtained in the form of a 67% concentrate by freezing in the manner hereinbefore described.

Example VII 4.35 kgs. of vulcanized rubber latex, stabilized with potash lye and soap, of 44% concentration (=1.92 kgs. dry substance) after partial freezing whilst stirring, gave the following three fractions—

1st fraction:
   2.74 kgs. of 55.3% concentration (=1.50 kgs. of dry substance).
2nd fraction:
   0.96 kg. of 34.3% concentration.
3rd fraction:
   0.58 kg. of 6.6% concentration.

I claim:

1. A method of concentrating aqueous dispersions of rubber and rubber-like substances, which comprises partly freezing such dispersions and thereupon separating the partly frozen dispersions into a liquid portion rich in rubber and a solid portion poor in rubber.

2. A method of concentrating aqueous dispersions of rubber and rubber-like substances, which comprises partly freezing such dispersions and thereupon separating the partly frozen dispersions into a liquid portion rich in rubber and a solid portion free from rubber.

3. A method of concentrating aqueous dispersions of rubber and rubber-like substances, which comprises partly freezing such dispersions, thereupon separating the partly frozen dispersions into a liquid portion rich in rubber and a solid portion poor in rubber and subjecting the liquid portion rich in rubber to a further freezing and separating treatment in order further to concentrate the same.

4. A method of concentrating aqueous dispersions of rubber and rubber-like substances which comprises partly freezing said dispersions while agitating same, separating the partly frozen dispersions into a liquid portion rich in rubber and a solid portion poor in rubber.

5. A method of concentrating aqueous dispersions of rubber and rubber-like substances which comprises partly freezing said dispersions while agitating same, separating the partly frozen dispersions into a liquid portion rich in rubber and a solid portion free from rubber.

6. A method of concentrating aqueous dispersions of rubber and rubber-like substances which comprises partly freezing said dispersions while introducing gas thereinto, separating the partly frozen dispersions into a liquid portion rich in rubber and a solid portion poor in rubber.

7. A method of concentrating aqueous dispersions of rubber and rubber-like substances, which comprises partly freezing such dispersions, thereupon separating the partly frozen dispersions into a liquid portion rich in rubber and a solid portion poor in rubber and treating the portion poor in rubber for the purpose of concentrating the same.

8. A method according to claim 7, in which the portion poor in rubber is subjected to a further freezing and separation treatment.

9. A method of concentrating aqueous dispersions of rubber and rubber-like substances which comprises subjecting such dispersions to conditions to bring them into a partly frozen state, and thereupon separating the partly frozen dispersion into a liquid portion rich in rubber and a solid portion poor in rubber.

10. A method of concentrating aqueous dispersions of rubber and rubber-like substances which comprises subjecting such dispersions to freezing, then partly thawing the frozen dispersions and thereupon separating the partly frozen dispersions into a liquid portion rich in rubber and a solid portion poor in rubber.

HANS DIETRICH GRAF von SCHWEINITZ.